United States Patent [19]

Eccles et al.

[11] 4,452,911
[45] Jun. 5, 1984

[54] FRANGIBLE CATALYST PRETREATMENT METHOD FOR USE IN HYDROCARBON HYDRODEMETALLIZATION PROCESS

[75] Inventors: Richard M. Eccles, Princeton; Allen S. U. Li, Morristown; Shyy-Jong D. Lin, Delran; Virginia A. Malik, Cranbury; Michael C. Chervenak, Pennington, all of N.J.

[73] Assignee: HRI, Inc., Gibbsboro, N.J.

[21] Appl. No.: 521,861

[22] Filed: Aug. 10, 1983

[51] Int. Cl.$^3$ .................. B01J 21/02; B01J 23/16; B02C 19/06; B02C 25/00
[52] U.S. Cl. .................. 502/100; 502/300; 502/322; 502/503; 502/504; 502/514; 502/523; 208/251 H; 241/24; 241/5
[58] Field of Search ............... 502/100, 300, 322, 503, 502/504, 514, 523; 241/24, 5

[56] References Cited

U.S. PATENT DOCUMENTS

| | | | |
|---|---|---|---|
| 2,477,019 | 7/1949 | Utterbuck et al. | 502/300 |
| 2,488,560 | 11/1949 | Rettinger | 502/300 |
| 2,565,347 | 8/1947 | Bremer | 252/461 |
| 2,711,386 | 6/1955 | Delaplaine | 502/504 |
| 2,846,150 | 8/1958 | Wark | 241/5 |
| 2,865,570 | 12/1958 | Nutting | 241/24 |
| 2,885,154 | 5/1959 | Eastman | 241/5 |
| 3,219,281 | 11/1965 | Jasper et al. | 241/5 |
| 3,224,925 | 12/1965 | Brandts et al. | 241/24 |
| 3,416,739 | 12/1968 | Salonish | 241/5 |
| 3,514,043 | 5/1970 | Slepetys | 241/5 |
| 3,516,612 | 6/1970 | Fullman et al. | 241/24 |
| 3,614,000 | 6/1969 | Blythe | 241/5 |
| 3,643,875 | 2/1972 | Dille et al. | 241/5 |
| 3,702,882 | 11/1972 | Rettew et al. | 241/5 |
| 3,901,792 | 8/1975 | Wolk | 208/210 |
| 3,964,995 | 6/1976 | Wolk et al. | 208/210 |
| 4,293,632 | 10/1981 | Dickerson et al. | 208/5 |
| 4,394,132 | 7/1983 | Taylor | 241/5 |

FOREIGN PATENT DOCUMENTS 1050316  6/1965  United Kingdom ................ 241/24

Primary Examiner—Curtis R. Davis
Assistant Examiner—Helane E. Maull
Attorney, Agent, or Firm—Vincent A. Mallare

[57] ABSTRACT

Activated bauxite particulate material having usual nominal particle size range of 20–50 mesh (U.S. Sieve Series) is treated by fluidization in an upflowing gas so as to attrite the particles and stabilize the particle shape and size, thereby making the catalyst more uniform in shape and resistant to attrition in subsequent ebullated bed reactor operations. The treated activated bauxite catalyst material is then rescreened to provide a narrower differential size range having a particle equivalent diameter ratio range for large to small particles of about 1.4–2.0, and a preferred 20–30 mesh (U.S. Sieve Series) particle size range. The selected pretreated catalyst is then introduced into the ebullated bed reactor of a hydrodemetallization process for hydrocarbon feedstocks containing high metals concentration. Use of such pretreated bauxite catalyst particles results in improved reactor fluidization operations and less catalyst loss by attrition and carryover of fines from the reactor, and achieves improved results of 60–70 W % demetallization and 50–55 V % hydroconversion of the 975° F.$^{30}$ fraction to lower boiling hydrocarbon products in a single stage operation.

7 Claims, 4 Drawing Figures

FRANGIBLE CATALYST PRETREATMENT METHOD FOR USE IN HYDROCARBON HYDRODEMETALLIZATION PROCESS

BACKGROUND OF INVENTION

This invention pertains to an improved treated catalyst material useful for hydroconversion of hydrocarbon feedstocks containing high concentrations of metals-containing compounds. It pertains more particularly to a frangible catalyst comprising porous aluminum oxide promoted with metal oxides, and to a method for pretreating the catalyst material to make it more resistant to attrition during subsequent use and provide more stable operations in a hydrocarbon catalytic ebullated bed demetallization process.

Bauxite, a naturally-occuring low-cost aluminum oxide material when activated and promoted with certain metal oxides, is effective as a catalyst in upgrading heavy petroleum feedstocks having high metals content in an ebullated-bed reactor, provided that the catalyst can show satisfactory fluidization patterns and acceptable catalyst attrition rates in the reactor. For example, U.S. Pat. Nos. 3,901,792 and 3,964,995 to Wolk, et al., disclosed a two-stage process for demetallization and hydroconversion of high-metal content petroleum residuum feedstocks such as those obtained from Canada, Iran, and South America. The first stage reactor contained a porous bauxite catalyst material which contained promoters of metal oxides of iron, silicon and titanium and had a primary purpose of removing the metals such as vanadium and nickel compounds from the hydrocarbon feedstocks. Such demetallization of the feed in the first stage reactor was found to improve the second stage catalytic desulfurization performance significantly.

However, it has been found that some operational problems interfere with stable bed fluidization and sustained operations on metals-containing hydrocarbon feedstocks when using available activated bauxite catalyst material impregnated with metal oxide promoters such as about 0.5-3 W % molybdenum in an ebullated catalyst bed reactor. Typical operational problems encountered with the available 20×50 mesh size promoted activated bauxite catalyst were poor ebullation of the catalyst bed and excessive catalyst particle attrition and carryover rates from the reactor, thereby requiring excessive catalyst replacement rates. The poor catalyst bed fluidization patterns in the reactor led to erratic operations, and the high catalyst attrition rate and its subsequent excessive carryover from the reactor caused plugging problems in the reactor liquid recycle conduit and in lines downstream from the reactor. Thus, improvements in ebullated bed reactor operations on hydrocarbon feedstocks when using inherently frangible catalyst materials are needed.

SUMMARY OF INVENTION

The present invention provides a method for treating frangible catalyst materials such as particulate activated bauxite catalyst for use in subsequent ebullated bed hydrodemetallization operations on hydrocarbon feedstocks in an ebullated bed reaction process, so as to achieve improved bed ebullation and low attrition and carryover rates for the catalyst. This treatment method is advantageously used for treating an activated bauxite, i.e. aluminum oxide, catalyst material impregnated with a promoter material such as 0.5-10 W % molybdenum for use in an ebullated catalyst bed demetallization process.

More specifically, the present invention provides a method for treating a frangible particulate catalyst material for subsequent use in hydrocarbon feedstock hydroconversion operations, comprising fluidizing the catalyst particles in an upflowing gas at a gas superficial velocity of 0.5-3 ft/sec. for a time sufficient to abrade the particle sharp edges and stabilize the particle shape and size distribution; and then segragating the attrited and stabilized catalyst particles and removing the stabilized particles having a narrower differential size range for subsequent use in a demetallization reaction process for hydrocarbon feedstocks. For catalyst particles useful in this invention, the particles within the 5% and 95% percentile of all particles should have a particle equivalent diameter ratio of larger to smaller particles not exceeding about 2.0, and preferably in a diameter ratio range of 1.4–2.0. More specifically, the narrow particle differential size is such that the ratio of particle equivalent diameter (based on the volume/surface area ratio of the particles) at 95 W % undersize to that at 5 W % undersize does not exceed about 2.0, and preferably is within a ratio range of 1.4–2.0. Also, the catalyst particles should be within a mesh size range of about 16–40 (U.S. Sieve Series). For the activated bauxite promoted with 0.5-10 W % molybdenum, the most preferred mesh size particles is 20-30 mesh (U.S. Sieve Series).

The treatment method of this invention can be used to improve any frangible particulate catalyst material, and particularly activated bauxite, i.e. aluminum oxide, which has been impregnated with 0.5-3 W % molybdenum or other promotor metal oxides such as cobalt, nickel, iron or titanium up to about 10 W % total metals.

The upflowing gas used is preferably air at 1-2 ft/sec superficial velocity. The catalyst particles are usually fluidized for at least about 20 hours and usually not exceeding about 100 hours to achieve adequate treatment. Following the treatment, the segregated narrower size range catalyst particles preferably about 20-30 mesh for activated bauxite are introduced into an ebullated bed reactor for hydrodemetallization operations on hydrocarbon feedstocks containing significant concentration of metals compounds to produce lower boiling demetallized hydrocarbon liquid products.

This catalyst pretreatment method is advantageously used for inherently frangible catalyst materials used in a hydrodemetallization operation, and reduces the catalyst attrition and carryover rates from the reactor to acceptable levels. It provides for improved stable and sustained ebullated-bed hydrodemetallization operations on high metals-containing feedstocks to achieve 60–70 W % removal of nickel and vanadium combined along with 50–55 V % conversion of the 975° F.+ fraction to lower boiling hydrocarbon products in a single stage process.

DESCRIPTION OF INVENTION

Figure 1:
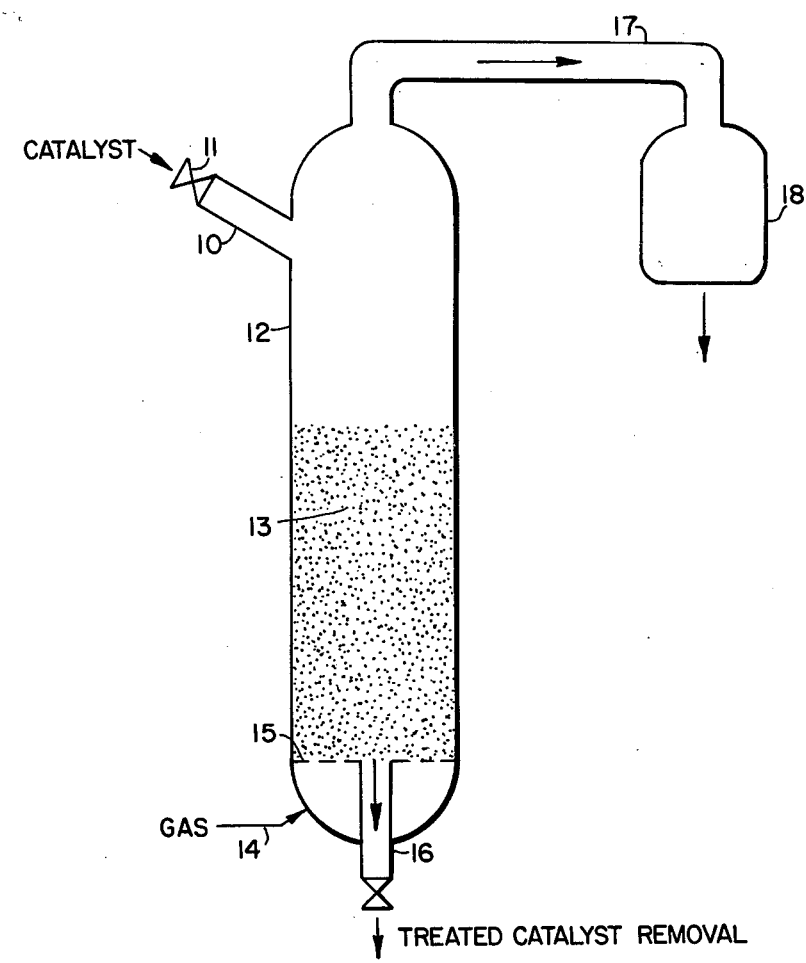
FIG. 1 is a schematic diagram of a system used for pretreating catalyst particles in accordance with the invention.

In accordance with the invention, activated bauxite, i.e. aluminum oxide, to which 0.5–8 W % molybdenum promoter has been added, is treated to stabilize the particle shape and size, after which the pretreated catalyst material is satisfactorily used in hydrodemetallization operations on metals-containing hydrocarbon feedstocks in an ebullated-bed reaction process to produce lower boiling hydrocarbon products. The catalyst pretreatment method consists of two steps, as generally shown in FIG. 1. The activated promoted bauxite catalyst material at 10, readily available having a nominal particle size range of 20–50 mesh (U.S. Sieve Series), is introduced into a treatment unit 12 so as to provide a catalyst bed 13 therein. A gas, which is preferably air, is introduced at 14 and flowed upwardly through distributor 15 into the bed. The bed is expanded and the catalyst particles are fluidized in the expanded bed at an upward gas superficial velocity preferably between about 1–2 ft/sec for a time duration between about 20 and 100 hours to pre-attrite the catalyst to stabilize the catalyst particle shape and size range and to remove very fine particles, e.g. particles smaller than about 100-mesh size. The gas is withdrawn as stream 17 along with very fine particles which are retained in filter 18 to avoid undesired dusting conditions. If the activated bauxite is obtained in wider particle size ranges, the catalyst material can be advantageously prescreened to provide catalyst particles having a size range of about 16–40 mesh before fluidizing the particles.

Following the air fluidization step, in which the catalyst particles are preattrited and made more uniform in shape, the catalyst particles usually having somewhat smaller sizes are removed from the bed at 16 and are screened to provide the desired close sizing preferably between about 20–30 mesh (U.S. Sieve Series) for their subsequent use in an ebullated bed reactor for a petroleum demetallization process.

The air-fluidization treatment of promoted bauxite catalyst particles provides an effective method to stabilize the catalyst particle size and reduce attrition and carryover rates form the reactor to acceptable levels in the subsequent ebullated-bed operations. By limiting the catalyst particle size distribution to an equivalent diameter ratio range of about 1.4–2.0 and preferably to 20–30 mesh size, a more stable ebullated-bed reaction process with uniform bed fluidization is achieved. This catalyst treatment method has provided a promoted activated bauxite catalyst material which has resulted in a stable and sustained demetallization operation using an improved promoted bauxite catalyst material.

Figure 2:
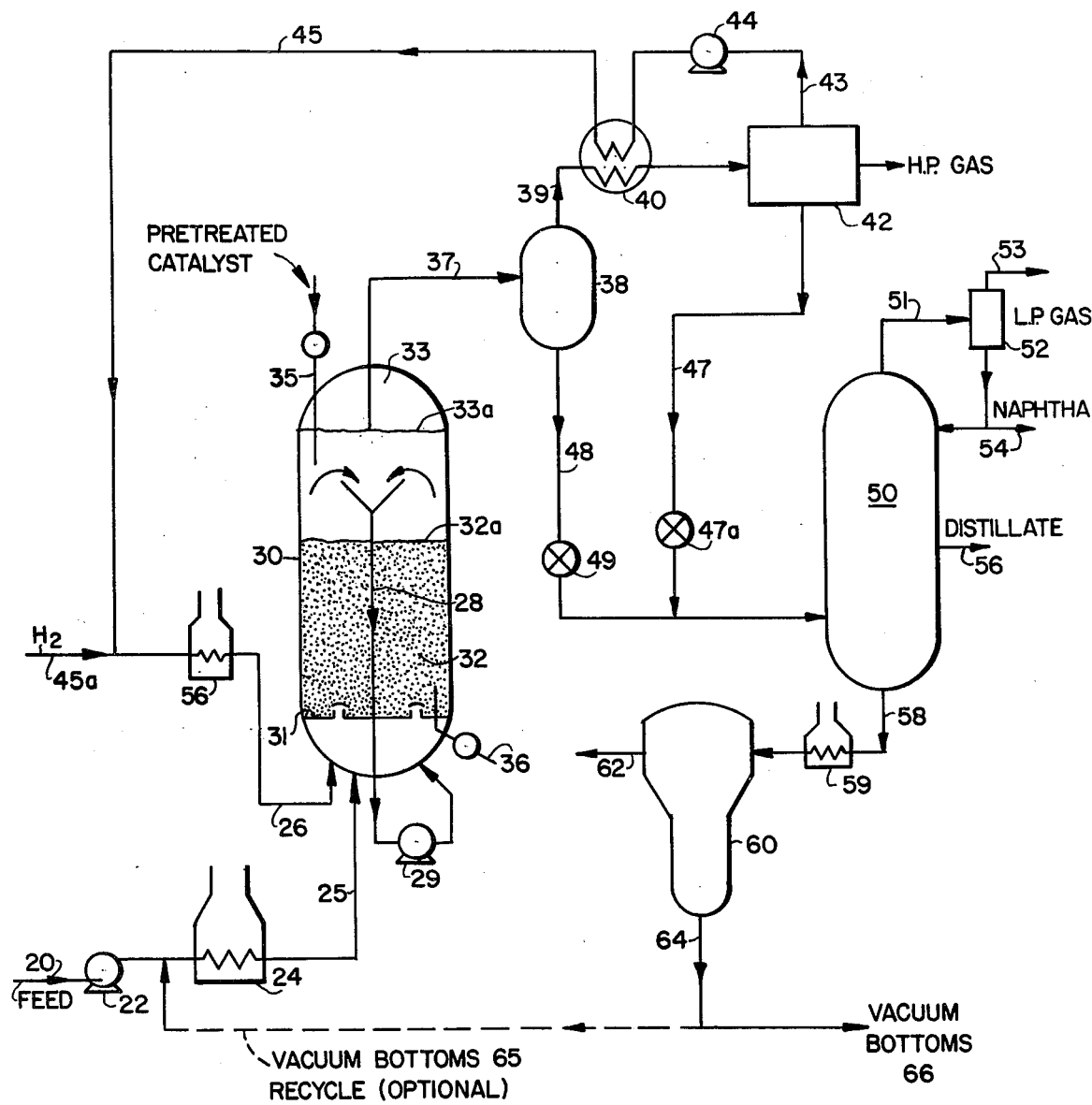
FIG. 2 is a schematic diagram of a typical catalytic demetallization process for hydrocarbon feedstocks suitable for using the pretreated catalyst.

Following the pretreatment steps for the catalyst, the pretreated catalyst is introduced into the reaction zone of a hydrodemetallization process. As generally shown in FIG. 2, the pretreated catalyst is introduced into ebullated bed reactor 30, to provide catalyst bed 32 therein. A petroleum residuum feedstock containing metal compounds including vanadium and nickel is preheated along with a hydrogen-rich gas stream and introduced into the lower end of reactor 30. If desired, reactor 30 can be the first stage of a two-stage process for demetallization of the feed in a first stage reactor, followed by desulfurization reactions in a second stage reactor using a high activity desulfurization catalyst.

A metals-containing petroleum feedstock at 20, such as Cold Lake or Lloydminster bottoms from Canada or Orinoco residua from Venezuela, is pressurized at 22 and passed through preheater 24 for heating to at least about 500° F. The heated feedstream at 25 is introduced into upflow ebullated bed catalytic reactor 30. Heated hydrogen is provided at 26, and is also introduced into reactor 30. This reactor is typical of that described in U.S. Pat. No. Re. 25,770, wherein a liquid phase reaction is accomplished in the presence of a reactant gas and a particulate catalyst such that the catalyst bed 32 is expanded. The reactor contains a flow distributor and catalyst support 31, so that the feed liquid and gas passing upwardly through the reactor 30 will expand the catalyst bed by at least about 10% over its settled height, and place the catalyst in random motion in the liquid.

The pretreated catalyst particles in ebullated bed 32 will have a relatively narrow size range for uniform bed expansion under controlled liquid and gas flow conditions. While the useful catalyst size range is between 16 and 40 mesh (U.S. Sieve Series) with an upflow liquid velocity between about 1.5 and 10 cubic feet per minute per square foot of reactor cross section area, the catalyst size is preferably particles of 20–30 mesh size. In the reactor, the density of the catalyst particles, the liquid upward flow rate, and the lifting effect of the upflowing hydrogen gas are important factors in the expansion of the catalyst bed. By control of the catalyst particle size and density and the liquid and gas upflowing velocities and taking into account the viscosity of the liquid at the operating conditions, the catalyst bed 32 is expanded to have an upper level or interface in the liquid as indicated at 32a. The catalyst bed expansion should be at least about 10% and seldom more than 80% of the bed settled or static level.

The proper ebullation of the catalyst in bed 32 in reactor 30 is greatly facilitated by use of a proper size catalyst. The pretreated catalyst used can be periodically added directly into the reactor 30 through suitable inlet connection means 35 at a rate between about 0.3 and 1.0 lbs catalyst/barrel feed, and used catalyst is withdrawn through suitable draw-off means 36.

Recycle of reactor liquid from above the solids interface 32a to below the flow distributor 31 is usually desirable to establish a sufficient upflow liquid velocity to maintain the catalyst in random motion in the liquid and to facilitate completeness of the reactions. Such liquid recycle is preferably accomplished by the use of a central downcomer conduit 28 which extends to a recycle pump 29 located below the flow distributor 31, to assure a positive and controlled upward movement of the liquid through the catalyst bed 32.

Operability of the ebullated catalyst bed reactor system to assure good contact and uniform (iso-thermal) temperature therein depends not only on the random motion of the catalyst in the liquid environment resulting from the buoyant effect of the upflowing liquid and gas, but also requires the proper reaction conditions. With improper reaction conditions insufficient demetallization is achieved. For the petroleum feedstocks useful in this invention, i.e. those having total metals at least about 300 ppm, the operating conditions needed in the reactor 30 are within ranges of 780°–850° F. temperature, 1000–3000 psig, hydrogen partial pressure, and space velocity of 0.20–1.50 $V_f/hr/V_r$ (volume feed per hour per volume of reactor). Preferred conditions are 790°–830° F. temperature, 1500–2800 psig, hydrogen partial pressure, and space velocity of 0.25–1.20 $V_f/hr/V_r$. The feedstock hydroconversion achieved is about 50–55 V % for the first stage of once through type operations.

In a reactor system of this type, a vapor space 33 exists above the liquid level 33a and an overhead stream containing both liquid and gas portions is withdrawn at 37, and passed to hot phase separator 38. The resulting gaseous portion 39 is principally hydrogen, which is cooled at heat exchanger 40, and may be recovered in gas purification step 42. The recovered hydrogen at 43 is warmed at heat exchanger 40 and recycled by compressor 44 through conduit 45, reheated at heater 46, and is passed into the bottom of reactor 30 along with make-up hydrogen at 45a as needed.

From phase separator 38, liquid portion stream 48 is withdrawn, pressure reduced at 49 to pressure below about 200 psig, and passed to fractionation step 50. A condensed vapor stream also is withdrawn at 47 from gas purification step 42 and also passed to fractionation step 50, from which is withdrawn a low pressure gas stream 51. This vapor stream is phase separated at 52 to provide low pressure gas product 53 and liquid stream 54 to provide reflux liquid to fractionator 50 and naphtha product stream 54. A middle boiling range distillate liquid product stream is withdrawn at 56, and a heavy hydrocarbon liquid is withdrawn at 58.

From fractionator 50, the heavy oil stream 58 which usually has normal boiling temperature range of 650° F.+, is withdrawn, reheated in heater 59 and passed to vacuum distillation step 60. A vacuum gas oil stream is withdrawn at 62, and vacuum bottoms stream is withdrawn at 64. If desired for two-stage operations, a portion 65 of the vacuum bottoms material usually boiling above about 975° F. can be recycled to the reactor system for further hydroconversion. A heavy vacuum pitch material is withdrawn at 66.

This invention will be further described by reference to the following examples, which should not be construed as limiting in scope.

EXAMPLE 1

Activated bauxite (aluminum oxide) material promoted with 1.0 W % molybdenum (designated LX-21 catalyst) was obtained, which had a particle size distribution generally within a range of 20–50 mesh (U.S. Sieve Series), with about 30% of the material being within a 20–30 mesh size range. The catalyst was segregated using a vibrating screen apparatus and a generally 20–30 mesh particle size cut removed along with some occluded fines.

The segregated 20–30 mesh size cut was treated in an air-fluidization unit, using an upward air superficial velocity of 1.2–1.7 ft/sec to produce a catalyst bed expansion of 30–50% for a time of 24–72 hours to preattrite the catalyst to remove sharp edges and make it more uniform in shape. The fluidization conditions and results of the catalyst fluidization runs are provided in Table 1, which indicated a catalyst cumulative attrition of about 3–11%.

TABLE 1

| CATALYST PREATTRITION BY AIR FLUIDIZATION | | | | | |
|---|---|---|---|---|---|
| Run No. | 219-1 | 219-2 | 219-3 | 219-4 | 219-5 |
| Catalyst Charge, lb. | 39.0 | 17.5 | 17.7 | 13.4 | 31.5 |

TABLE 1-continued

| CATALYST PREATTRITION BY AIR FLUIDIZATION | | | | | |
|---|---|---|---|---|---|
| Run No. | 219-1 | 219-2 | 219-3 | 219-4 | 219-5 |
| 30+ Mesh Fraction, W % | 57 | 96 | 95 | 97 | 99 |
| Period of Fluidization, hrs. | 24 | 56 | 72 | 72 | 72 |
| Initial/Final Percent Bed Expansion | 46/27 | 25/44 | 50/25[1] | 29/26 | 48/35 |
| Upward Superficial Air Velocity, fps | 1.2 | 1.4 | 1.6 | 1.7 | 1.7 |
| Cumulative Percent Attrition[2] | 3.1 | 15.4 | 8.2 | 10.6 | 2.7[3] |
| 30+ Mesh Fraction Recovered, W % | 54 | 87 | 94 | 94 | 81 |
| Catalyst Overall Recovery, W % | 99 | 99 | 100 | 94 | 99 |

[1]Air flow velocity during run increased from 1.26 to 1.63 ft/sec.
[2]Percent attrition defined as formation of particles smaller than 30 mesh size. Data for Runs 219-1 and 219-2 not reliable due to use of inaccurate weight scale.
[3]Cumulative particle attrition for last 48 hours only.

Figure 3:
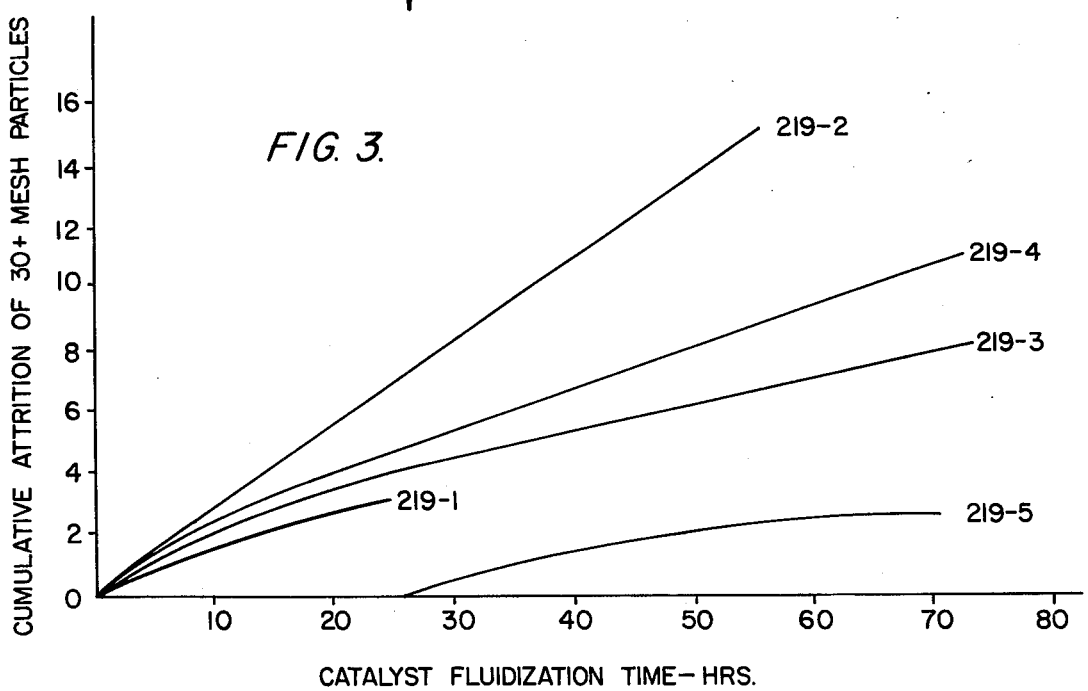
FIG. 3 is a graph showing untreated activated bauxite catalyst attrition rates plotted vs. particle fluidizing time.

Following this catalyst preattrition step, the material was again screened to remove the 30-mesh fine particles, i.e. particles smaller than 30 mesh size. From the fines removed, the rate of catalyst attrition was determined based on fluidization time, as is shown in FIG. 3. It is noted that for the most reliable data the rate of catalyst attrition during treatment decreased steadliy with fluidization time, and showed a tendency to level out or stabilize after about 72 hours fluidization. Further catalyst attrition by air fluidization was not done, because it was believed that subsequent catalyst particle attrition in an ebullated bed reactor containing both gas and liquid upward flow would be less severe than in the air fluidized bed treatment unit.

EXAMPLE 2

The fluid dynamics characteristics of the pre-treated 20–30 mesh size LX-21 catalyst were determined in a laboratory catalyst ebullation test conducted in a 6 inch diameter glass tube apparatus using nitrogen gas and liquid heptane to simulate typical ebullated bed reaction operations. The catalyst bed interface within the reactor was monitored with a nuclear guage arranged for regular vertical traverse of the bed. For catalyst bed expansions of 20–60% above its settled level using upward gas velocities of 0.04–0.16 fps and liquid velocities of 0.10–0.15 fps, the catalyst bed interface between catalyst and liquid was stable. This was indicated by relative bed densities measured within the reactor using the nuclear gage, which densities were fairly constant within the ebullated bed and dropped sharply to lower values in the gas-liquid zone above the bed, showing a uniform ebullation pattern throughout the bed and a sharp interface and the bed expansion correlated well with expected values.

EXAMPLE 3

Figure 4:
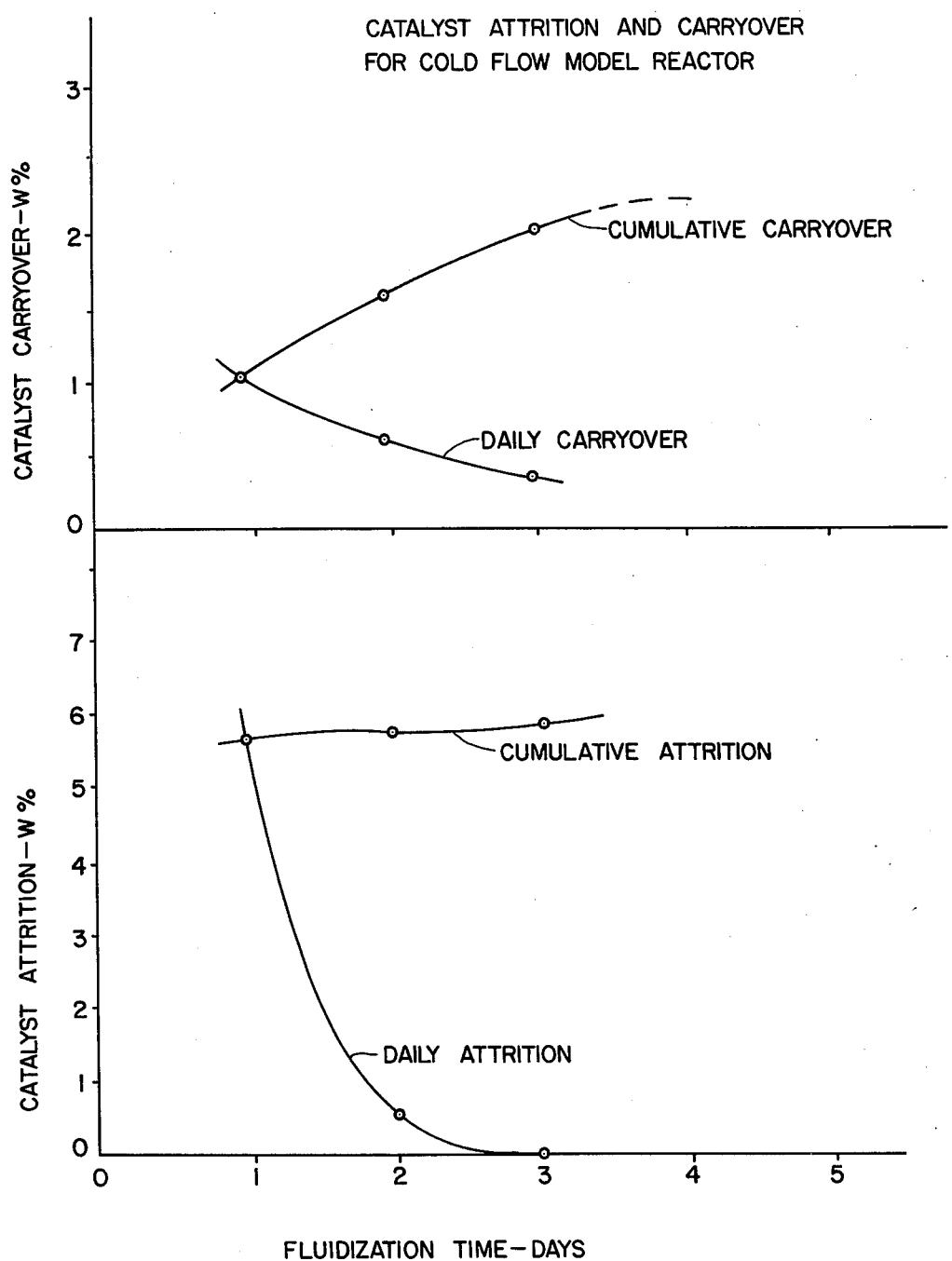
FIG. 4 is a graph showing pretreated catalyst attrition and carryover rates plotted vs. process operating time.

The viability of the pretreated catalyst material was determined in a sustained laboratory catalyst ebullation test conducted at ambient conditions in the 6 inch diameter glass column using the 20–30 mesh size bauxite LX-21 catalyst material pre-treated by air fluidization. The catalyst charge was ebullated using nitrogen gas and liquid heptane at 0.10–0.12 ft/sec upward gas velocity and 0.11–0.13 ft/sec upward liquid velocity to provide a bed expansion of about 60%. As shown by FIG. 4, the catalyst attrition rate declined rapidly with time from about 5.7 W % per day to less than 1% per day, and the resulting cumulative catalyst attrition rate during a fluidization period of 74 hours was 5.9 W %. Furthermore, shown in FIG. 4, it was determined that the cumulative catalyst carryover for the 74 hour period was only 2.1 W % and did not increase appreciably with time, which is to be compared with a total of about 30 W % catalyst loss due to attrition and carryover during 170 hours operation for untreated 20–50 mesh size bauxite catalyst.

EXAMPLE 4

Further sustained ebullated catalyst bed operations were conducted on a petroleum feedstock material (#2 fuel oil) in 0.6 inch inside diameter ebullated bed reactor using pretreated 20–30 mesh size LX-21 bauxite catalyst to simulate typical reactor operations. The catalyst characteristics are provided in Table 2. The feedstock was No. 2 fuel oil and reactor conditions of 300° F. temperature and 1000 psig pressure were used to provide a reactor liquid viscosity and fluid velocities closely simulating those which occur in typical ebullated bed hydrodemetallization operations on heavy petroleum feedstocks.

TABLE 2
INSPECTION OF FRESH LX-21 CATALYST

| Designation | Preattrited LX-21* |
|---|---|
| Nominal Size | 20–30 Mesh |
| Molybdenum (Nominal), W % | 1.0 |
| Physical Properties | |
| Surface Area, M²/gm | 105.1 |
| Pore Volume, cc/gm (>30 Å) | 0.243 |
| Compacted Bulk Density, gm/cc | 1.002 |
| Pore Size Distribution (Pore Volume) | 0.243 |
| >30 Å Diameter, cc/gm | |
| >250 Å Diameter, cc/gm | 0.115 |
| >500 Å Diameter, cc/gm | 0.090 |
| >1500 Å Diameter, cc/gm | 0.060 |
| >4000 Å Diameter, cc/gm | 0.050 |

*Preattrited for 92 hours in air fluidization column, with catalyst fluidized to a 50–75% bed expansion.

Results from a 74 hour run are shown in Table 3, and indicated that a stable, uniform bed ebullation level was obtained. The catalyst attrition rate was nominal and the carryover rate was only about 1.6 W %, based on the original catalyst charged into the reactor.

EXAMPLE 5

To verify the catalyst attrition and carryover performance for the pretreated bauxite catalyst under actual reaction conditions at typical elevated temperatures and pressures, a sustained run of over 14 days duration was conducted using pre-treated 20–30 mesh LX-21 bauxite catalyst in an 0.6 inch diameter single stage ebullated bed reactor at about 800°–810° F. temperature and 2100–2400 psig hydrogen partial pressure conditions, using a typical petroleum residuum feedstock containing high metals and sulfur. Characteristics of the catalyst used are shown in Table 2, and characteristics of the feedstock are shown in Table 3. The results are provided in Table 4.

TABLE 4
REACTOR OPERATIONS USING PRETREATED LX-21 CATALYST

| Reactor Feed Material | Example #4 No. 2 Fuel oil | Example #5 Bachaquero Vacuum Btms. |
|---|---|---|
| Reactor Conditions: | | |
| Temperature, °F. | 300 | 800–810 |
| Hydrogen Pressure, psig | 1000 | 2100–2400 |
| Feed Rate, cc/hr | 240 | 240 |
| Catalyst Carryover, W % | 1.6 | 6 |
| Conversion, V % | | 50.4 |
| Catalyst Age, bbl/lb | | 1.0 |
| Avg. Metals Removal, W % | | |
| Overall | | 60 |
| Vanadium | | 65 |
| Nickel | | 50 |
| Sulfur Removal, W % | | 55 |

TABLE 3
FEEDSTOCK INSPECTION

| Feedstock | Bachaquero Vacuum Bottoms |
|---|---|
| Gravity, °API | 6.3 |
| Sulfur, W % | 3.71 |
| Carbon, W % | 85.90 |
| Hydrogen, W % | 10.35 |
| RCR, W % | 19.51 |
| Nitrogen, ppm | 5922 |
| Vanadium, ppm | 795 |
| Nickel, ppm | 89 |
| Calcium, ppm | 38 |
| Sodium, ppm | 16 |
| Chloride, ppm | 5 |
| IBP-975° F. | |
| Volume, % | 18.4 |
| Gravity, °API | 14.5 |
| Sulfur, W % | 2.74 |
| 975° F.+ | |
| Volume, % | 81.6 |
| Gravity, °API | 4.7 |
| Sulfur, W % | 3.84 |
| Vanadium, ppm | 779 |
| Nickel, ppm | 102 |

It was found that satisfactory demetallization of the feedstock was achieved, which declined slightly with increased hours on stream and catalyst age up to about 14 days, as would be expected. The catalyst carryover rate was substantially less than a catalyst replacement rate of 0.5 to 1.0 lb/bbl feed typically anticipated for commercial H-Oil ® demetallization operations with catalyst addition and withdrawal from the reactor. It is expected that these catalyst attrition and carryover rates would also occur in larger diameter commercial size reactors.

Although this invention has been described broadly and with reference to certain preferred embodiments thereof, it will be understood that modifications and variations of the process can be made and that some steps can be used without others all within the spirit and scope of the invention, which is defined by the following claims.

We claim:

1. A method for treating a frangible granular catalyst material prior to use in a hydrocarbon feedstock hydroconversion operation, comprising:
   (a) fluidizing the fringible catalyst particles in an upflowing gas at a gas superficial velocity of 0.5–3 ft/sec. for at least about 20 hours to attrite the particle sharp edges and thereby stabilize the particle shape and size; and
   (b) segregating the attrited and stabilized catalyst particles, and removing those particles having a narrow differential size range wherein the particle equivalent diameter ratio of large to small particles does not exceed about 2.0 for subsequent use in a demetallization reaction process for hydrocarbon feedstocks.

2. The catalyst treatment method of claim 1, wherein the treated catalyst particles have a particle diameter ratio range of 1.4 to 2.0.

3. The catalyst treatment method of claim 1, wherein the catalyst particles are activated bauxite which have been promoted with 0.5–8 W % molybdenum.

4. The catalyst treatment method of claim 1, wherein the upflowing gas is air at 1–2 ft/sec superficial velocity.

5. The catalyst treatment method of claim 1, wherein the catalyst particles have initial size range of 20–50 mesh size (U.S. Sieve Series) and are prescreened to remove particles smaller than about 30 mesh (U.S. Sieve Series) and then fluidized for 20–200 hours to attrite and substantially stabilize the particle size.

6. The catalyst treatment method of claim 1, wherein the catalyst particles removed have size within a range of 20–30 mesh (U.S. Sieve Series) and are introduced into an ebullated bed reactor for use in catalytic hydrodemetallization of a hydrocarbon feedstock.

7. A method for treating a frangible particulate catalyst material for use in improved hydrocarbon feedstock hydrodemetallization operations having reduced catalyst attrition and carryover rates, said method comprising:
(a) screening a particulate activated bauxite catalyst promoted with 0.5–3 W % molybdenum and having 20–50 mesh size (U.S. Sieve Series) and removing particles smaller than about 30 mesh;
(b) fluidizing the remaining 20–30 mesh size particles in an upflowing gas at a superficial gas velocity of 0.5–3 ft/sec for 20–200 hours to attrite the particle sharp edges and thereby stabilize the particle shape and size; and
(c) screening the attrited and stabilized catalyst particles, and removing those particles having a size range of about 20–30 mesh (U.S. Sieve Series) for subsequent use in an ebullated bed reactor for hydrodemetallization reaction process for hydrocarbon feedstocks.

* * * * *